US010819259B2

(12) United States Patent
Reddy et al.

(10) Patent No.: US 10,819,259 B2
(45) Date of Patent: Oct. 27, 2020

(54) PERMANENT MAGNET BASED ELECTRIC MACHINE HAVING ENHANCED TORQUE

(71) Applicant: General Electric Company, Schenectady, NY (US)

(72) Inventors: Patel Bhageerath Reddy, Niskayuna, NY (US); Deepak Aravind, Bangalore (IN)

(73) Assignee: GE GLOBAL SOURCING LLC, Norwalk, CT (US)

( * ) Notice: Subject to any disclaimer, the term of this patent is extended or adjusted under 35 U.S.C. 154(b) by 382 days.

(21) Appl. No.: 15/586,336

(22) Filed: May 4, 2017

(65) Prior Publication Data

US 2018/0323664 A1    Nov. 8, 2018

(51) Int. Cl.
| | |
|---|---|
| H02K 1/22 | (2006.01) |
| H02K 1/30 | (2006.01) |
| H02K 1/27 | (2006.01) |
| H02P 6/32 | (2016.01) |
| H02K 21/04 | (2006.01) |
| H02P 25/024 | (2016.01) |

(52) U.S. Cl.
CPC .............. *H02P 6/32* (2016.02); *H02K 1/30* (2013.01); *H02K 21/042* (2013.01); *H02P 25/024* (2016.02); *H02K 1/276* (2013.01); *H02K 1/278* (2013.01)

(58) Field of Classification Search
CPC ........ H02K 1/30; H02K 1/223; H02K 1/2706; H02K 1/276; H02K 1/278; H02K 1/2786; H02K 21/042; H02P 6/32; H02P 25/024
USPC .................................................. 310/156.13
See application file for complete search history.

(56) References Cited

U.S. PATENT DOCUMENTS

| | | | |
|---|---|---|---|
| 6,141,856 A | 11/2000 | Johnson et al. | |
| 6,147,429 A | 11/2000 | Akemakou et al. | |
| 6,271,613 B1 | 8/2001 | Akemakou et al. | |
| 6,956,311 B2 | 10/2005 | Hosaka | |
| 7,417,349 B2 | 8/2008 | Tajima et al. | |
| 2007/0090713 A1* | 4/2007 | Arita | H02K 21/042 310/181 |
| 2010/0207480 A1 | 8/2010 | Reutlinger | |

(Continued)

FOREIGN PATENT DOCUMENTS

| | | |
|---|---|---|
| CN | 1228639 A | 9/1999 |
| RU | 107 418 U1 | 8/2011 |

(Continued)

OTHER PUBLICATIONS

Naohisa et al., "Torque Performance and Permanent Magnet Arrangement for Interior Permanent Magnet Synchronous Motor", IEEJ Transactions on Industry Applications, vol. 126, Issue 7, pp. 954-960, 2006.

(Continued)

*Primary Examiner* — Alex W Mok
(74) *Attorney, Agent, or Firm* — John P. Darling; The Small Patent Law Group, LLC

(57) ABSTRACT

An electric machine is presented. The electric machine includes a stator. The electric machine further includes rotor disposed adjacent to the stator. The rotor includes a rotor core, a plurality of permanent magnets disposed in contact with the rotor core, a plurality of permanent magnets disposed in contact with the rotor core to modulate torque exerted on the rotor.

20 Claims, 5 Drawing Sheets

(56) References Cited

U.S. PATENT DOCUMENTS

| | | | |
|---|---|---|---|
| 2010/0327689 A1 | 12/2010 | Sakai et al. | |
| 2011/0210686 A1* | 9/2011 | Sengchanh | H02K 1/146 318/135 |
| 2012/0153763 A1* | 6/2012 | Kenji | H02K 21/028 310/156.43 |
| 2014/0015364 A1 | 1/2014 | Iwatsu et al. | |
| 2015/0318743 A1 | 11/2015 | Baba et al. | |
| 2016/0204722 A1* | 7/2016 | Sudhoff | H02K 21/042 310/156.25 |

FOREIGN PATENT DOCUMENTS

| | | |
|---|---|---|
| SU | 130963 A1 | 11/1960 |
| SU | 581553 A1 | 11/1977 |
| WO | 2014104824 A1 | 7/2014 |

OTHER PUBLICATIONS

Zhao et al., "Optimal Design of a Novel V-Type Interior Permanent Magnet Motor with Assisted Barriers for the Improvement of Torque Characteristics", Research Gate, vol. 50, Issue 11, pp. 1-4, Nov. 2014.

Svihus, "Investigation of Interior Permanent Magnet Machines with Concentrated Windings for High Dynamics Applications", Norwegian University of Science and Technology, https://brage.bibsys.no/xmlui/bitstream/handle/11250/2368193/12713_FULLTEXT.pdf?sequence=1&isAllowed=y, Jun. 2015.

Search Report issued in connection with corresponding EA Application No. 201890793 dated Jan. 16, 2019.

English Translation of the First Office Action for related Chinese Patent Application No. 201810419976.0 dated Jun. 30, 2020 (13 pages).

Office action issued by the Eurasian Patent Office dated Aug. 12, 2020 for corresponding Eurasian Patent application No. 201890793.

English translation of the Office action issued by the Eurasian Patent Office dated Aug. 12, 2020 for corresponding Eurasian Patent application No. 201890793.

* cited by examiner

PERMANENT MAGNET BASED ELECTRIC MACHINE HAVING ENHANCED TORQUE

BACKGROUND

Embodiments of the present specification relate to an electric machine, and more particularly to a permanent magnet based electric machine having a rotor with enhanced torque.

As will be appreciated, the term electric machine is generally used to refer to a machine such as a motor or a generator having a rotor and a stator. Non-limiting examples of the electric machine include a radial field electric machine, an axial field electric machine, a transverse field electric machine, and the like. Typically, an electric machine includes a stator and a rotor that is movable, for example rotatable, with respect to the stator. Further, the rotor and/or stator include laminates stacked along an axial direction of the electric machine. The electric machines also include magnets, such as permanent magnets, to generate magnetic field.

Currently, electric machines are used in a variety of applications. By way of example, the electric machines are used in electric pumps, such as electric submersible pumps (ESPs). The ESPs are generally deployed to extract fluids from locations below the earth's surface, sub-sea fields, and the like. It is desirable to maximize fluid extraction by the ESPs for a given time duration. A fluid lifting power of the ESPs generally affects an amount of fluid that is extracted by the ESPs in a given time duration. Typically, the fluid lifting power of an electric submersible pump (ESP) is a function of a torque of the electric machines used in that ESP. Existing electric machines typically experience limited torque that translates to limited fluid lifting power of the ESPs that employ these electric machines.

BRIEF DESCRIPTION

In accordance with one embodiment of the present specification, an electric machine is presented. The electric machine includes a stator. The electric machine further includes rotor disposed adjacent to the stator. The rotor includes a rotor core, a plurality of permanent magnets disposed in contact with the rotor core, and one or more electrically conductive coils disposed at least partially within the rotor core. Moreover, the electric machine includes a power source electrically coupled to the one or more electrically conductive coils to supply electrical excitation to the one or more electrically conductive coils to modulate torque exerted on the rotor.

In accordance with another embodiment of the present specification, an electric machine is provided. The electric machine includes a stator. The electric machine further includes rotor disposed adjacent to the stator. The rotor includes a rotor core, a plurality of permanent magnets disposed in contact with the rotor core, one or more electrically conductive coils disposed at least partially within the rotor core to modulate torque exerted on the rotor.

In accordance with yet another embodiment of the present specification, an electric motor is provided. The electric motor includes a stator having a plurality of windings configured to be excited by an alternating current. The electric motor further includes a rotor disposed adjacent to the stator. The rotor includes a rotor core, a plurality of permanent magnets disposed in contact with the rotor core, and one or more electrically conductive coils disposed at partially within the rotor core. Moreover, the electric motor includes an alternating current (AC) to direct current (DC) converter electrically coupled between the one or more electrically conductive coils and the plurality of windings to generate a DC current from the AC current supplied to the plurality of windings and supply the DC current to the one or more electrically conductive coils to modulate torque exerted on the rotor.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

In the following specification and the representative embodiments, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In some embodiments, the term "electric machine" as used herein refers to a machine that operates using electricity and utilizes permanent magnets to cause mechanical movement of one or more elements of the electric machine in response to electricity. A non-limiting example of such an electric machine includes an electric motor. In some other embodiments, the term "electric machine" may refer to a machine capable of generating electricity by employing permanent magnets. A non-limiting example of such an electric machine includes a generator. Moreover, electric machines may be classified into topologies, such as, but not limited to, radial field electric machines, axial field electric machines, and transverse field electric machines.

In some embodiments, an electric machine includes a stator and a rotor disposed adjacent to the stator. The rotor includes a rotor core, a plurality of permanent magnets disposed in contact with the rotor core, and one or more electrically conductive coils disposed at least partially within the rotor core. Further, in certain embodiments, the electric machine may include a power source electrically coupled to the one or more electrically conductive coils to supply electrical excitation to the one or more electrically conductive coils to modulate torque exerted on the rotor. In some embodiments, the one or more electrically conductive coils when electrically excited by the power source enhances an amount of torque exerted on the rotor.

Figure 1:
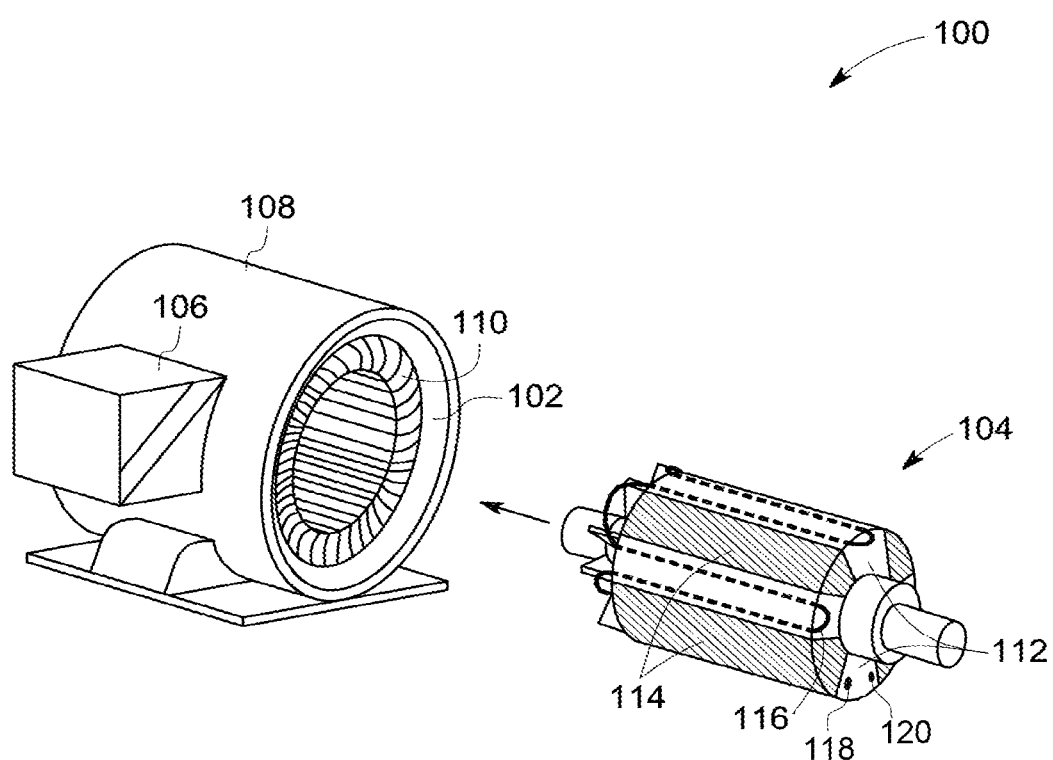
FIG. 1 is a diagrammatical representation showing an expanded view of an electric machine, in accordance with one or more embodiments of the present specification.

FIG. 1 is a diagrammatical representation showing expanded view of an electric machine 100, in accordance with one or more embodiments of the present specification. The electric machine 100 may be a radial field electric machine, an axial field electric machine or a transverse field electric machine. Though the electric machine 100 of FIG. 1 is described as an electric motor, it may be noted that some embodiments described herein with respect to the electric machine 100 are also applicable to the electric machine 100 as a generator.

Figure 2:
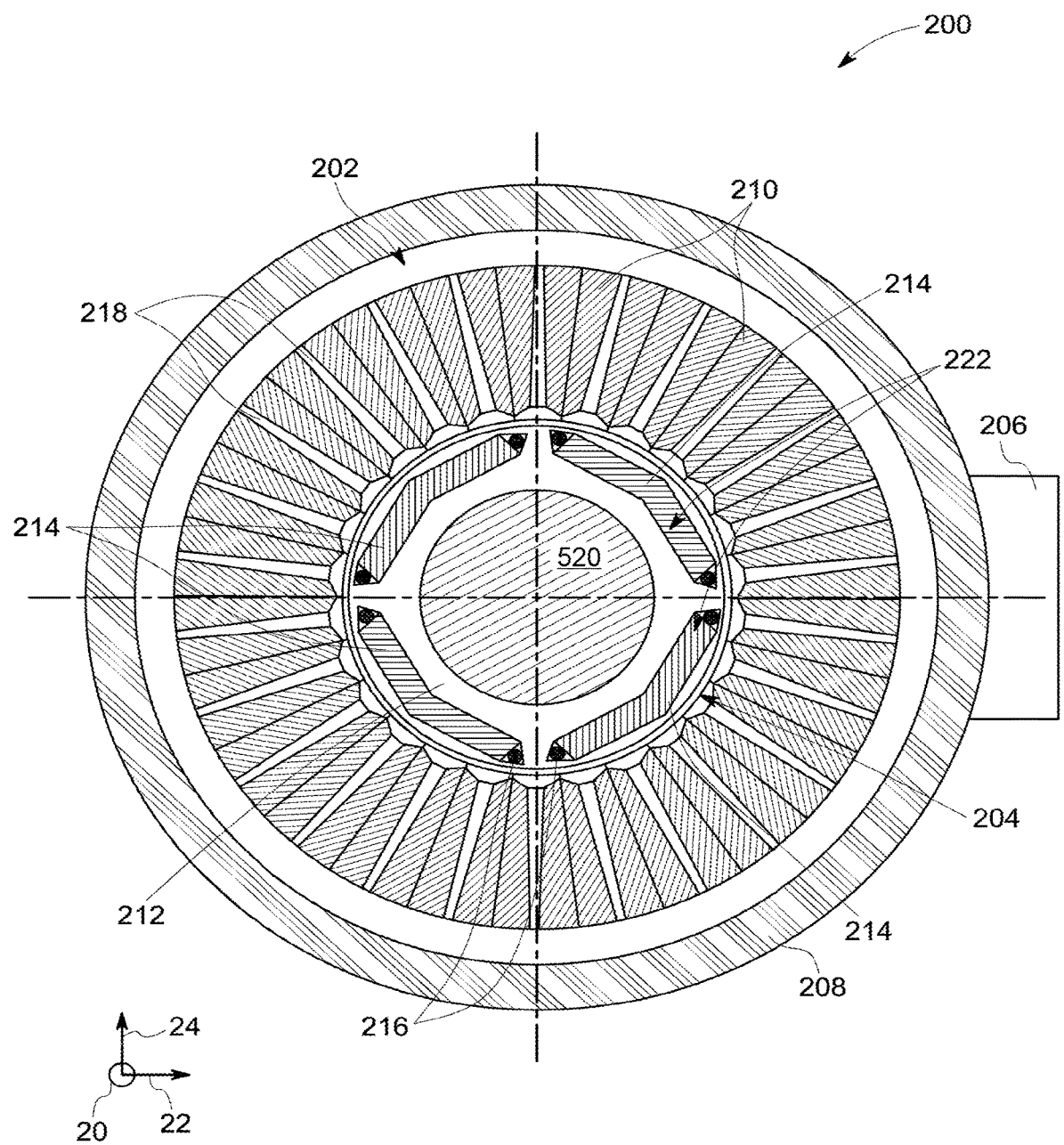
FIG. 2 is a diagrammatical representation of a cross-sectional view of an electric machine, in accordance with one or more embodiments of the present specification.
Figure 5:
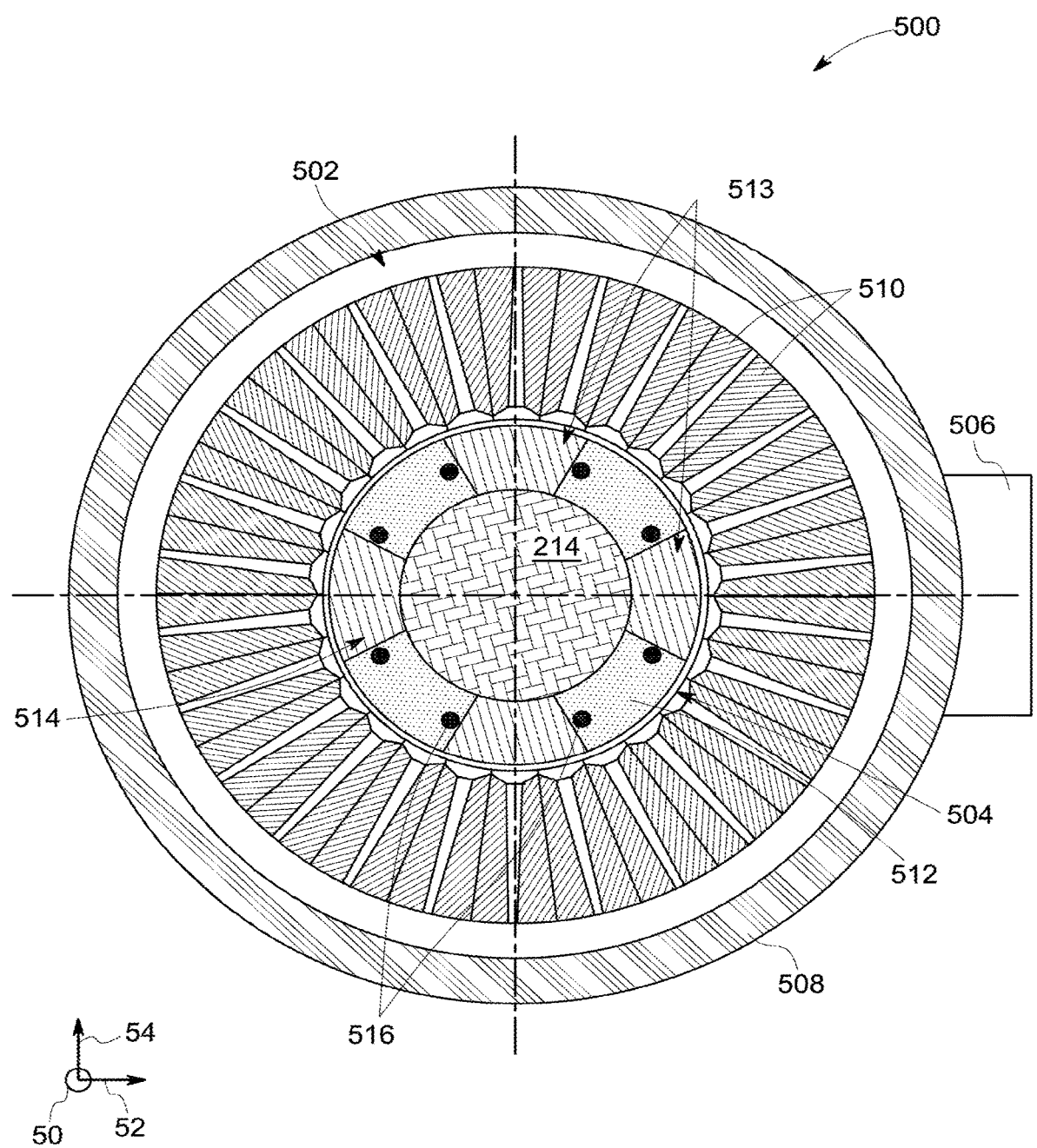
FIG. 5 is a diagrammatical representation of a cross-sectional view of an alternative embodiment of an electric machine.
Figure 6:
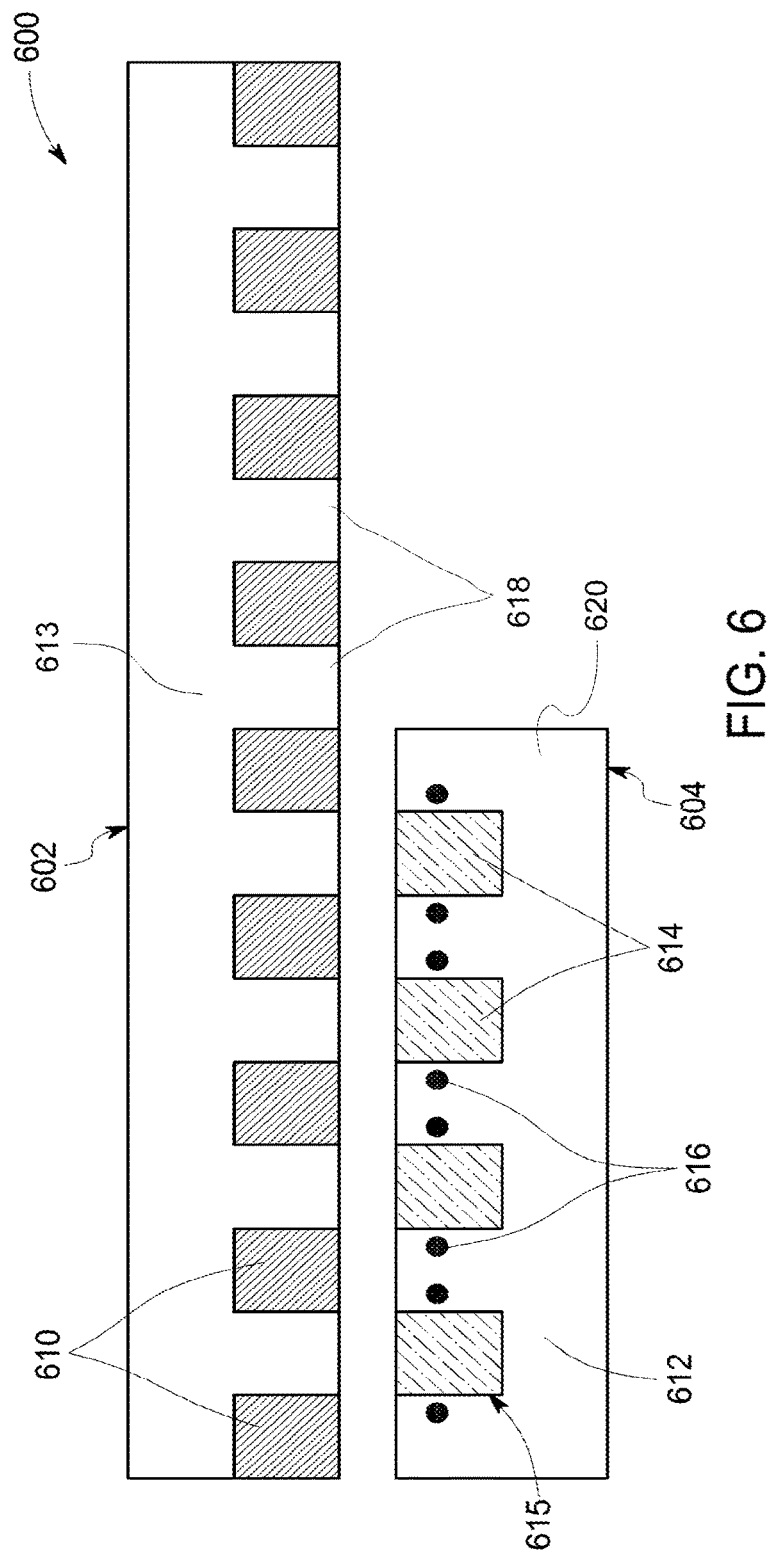
FIG. 6 is a diagrammatical representation of an axial cross-sectional view of yet another embodiment of an electric machine.

The electric machine 100 includes a stator 102, a rotor 104, and a power source 106. The stator 102 is disposed adjacent to the rotor 104. As used herein, the term "disposed adjacent to" with respect to positioning of the stator 102 and the rotor 104, refers to relative positioning of the stator 102 and the rotor 104 such that the rotor 104 is surrounded by the stator 102 (for example, as illustrated in FIGS. 2 and 5), the stator 102 is surrounded by the rotor 104, or the stator 102 and the rotor 104 are disposed side-by-side (for example, as illustrated in FIG. 6).

In some embodiments, the stator 102, the rotor 104, and the power source 106 are disposed within a housing 108. In certain embodiments, while the stator 102 and the rotor 104 are disposed within the housing 108, the power source 106 may be disposed outside the housing 108 (for example, as illustrated in FIGS. 2 and 5).

The stator 102 may include a stator winding 110 to receive alternating current (AC) or direct current (DC) from an external power supply (not shown in FIG. 1). The stator winding 110 may be a single-phase winding or a multi-phase winding such as a three-phase winding. During operation, when current flows through the stator winding 110, an electromagnetic field is generated within the electric machine 100.

The rotor 104 may include a rotor core 112 and a plurality of permanent magnets 114 disposed in contact with the rotor core 112. In some embodiments, the permanent magnets 114 are disposed within the rotor core (for example, as illustrated in FIG. 2). In some other embodiments, the permanent magnets 114 are disposed in contact with the rotor core such that at least one surface of each permanent magnet 114 is exposed to the stator 102 (see FIGS. 5 and 6). Typically, each of the permanent magnets 114 creates a magnetic field. During operation, the electromagnetic field caused by the stator 102 and the magnetic field caused by the permanent magnets 114 exert a torque on the rotor 104. Such torque on the rotor 104 leads to a rotational or a reciprocating movement of the rotor 104.

Typically, the torque exerted on a rotor of traditional electric machines is limited by various parameters including, but not limited to, a magnitude of the current flowing through a stator winding, a frequency of a current flowing through the stator winding, configurations of a stator and/or the rotor, and a flux density (i.e., flux per unit area) of the magnetic field of permanent magnets4. In some applications, for example, using the electric machine in an electrical submersible pump (ESP), it is beneficial to have additional torque to enhance fluid lifting power of the ESP. To facilitate such increased demand of torque, the electric machine 100 of FIG. 1, in some embodiments, includes the rotor 104 having one or more electrically conductive coils 116 and the power source 106 coupled to the electrically conductive coils 116.

The electrically conductive coils 116 are made using electrically conductive materials including, such as, but not limited to, copper, aluminum, anodized aluminum, silver, gold, or combinations thereof. In certain embodiments, low weight electrically conductive materials are desirable to increase or at least maintain a power density of the electric machine 100. In some embodiments, the electrically conductive coils 116 may be disposed at least partially within the rotor core 112. In alternative embodiments, the electrically conductive coils 116 may be disposed completely within the rotor core 112. Reference numerals 118 and 120 represent end terminals of the electrically conductive coils 116. Further details regarding placement of such electrically conductive coils in the rotor core is described with regard to FIGS. 3 and 4.

The power source 106 is electrically coupled to the electrically conductive coils 116 and configured to electrically excite the electrically conductive coils 116. In some embodiments, the end terminals 118 and 120 of the electrically conductive coils 116 are coupled to the power source 106. In certain embodiments, the end terminals 118 and 120 of the electrically conductive coils 116 may be coupled to the power source 106 via a rotary contactor (not shown in FIG. 1).

In some embodiments, the power source 106 may be configured to supply DC current to the electrically conductive coils 116 to electrically excite the electrically conductive coils 116. In some of these embodiments, the power source 106 may include a power converter such as an AC to DC converter electrically coupled between the stator winding 110 and the electrically conductive coils 116. The AC to DC converter is configured to receive the AC current supplied to the stator winding 110 and convert the received AC current to the DC current and supply the DC current to the electrically conductive coils 116. Alternatively, the power source 106 may include a battery. The battery may be coupled to the electrically conductive coils 116 to supply the DC current to the electrically conductive coils 116. In certain embodiments, the power source 106 may include a power converter such as a DC to DC converter coupled between the battery and the electrically conductive coils 116. The DC to DC converter is configured to control the DC current supplied from the battery to the electrically conductive coils 116.

In certain embodiments, the power source 106 may be configured to supply the AC current to the electrically conductive coils 116 to electrically excite the electrically conductive coils 116. In some of these embodiments, the power source 106 may include a power converter such as an AC-AC converter and/or a transformer which is coupled between the stator winding 110 and the electrically conductive coils 116.

When an AC or DC current is supplied to the electrically conductive coils 116 from the power source 106, the electrically conductive coils 116 may act as electromagnets and facilitate creation of another electromagnetic field in addition to the electromagnetic field caused by the stator 102 and the magnetic field caused by the permanent magnets 114. Such additional electromagnetic field increases a flux density of the magnetic field caused by the permanent magnets 114. This increased flux density in turn increases an overall torque exerted on the rotor 104. In some embodiments, by controlling the current through the electrically conductive coils 116, an operating torque of the rotor 104 may be modulated. For example, by increasing the current through the electrically conductive coils 116, the operating torque of the rotor 104 may be enhanced.

FIG. 2 is a diagrammatical representation of a cross-sectional view of an electric machine 200, in accordance with one or more embodiments of the present specification. The electric machine 200 is representative of one embodiment of the electric machine 100 of FIG. 1. Reference numerals 20, 22, and 24 respectively represents an axial direction, a radial direction, and a tangential direction of the electric machine 200. In the illustrated embodiment of FIG. 2, the electric machine 200 is a radial field electric machine, such as an interior permanent magnet (IPM) motor. The electric machine 200 includes a stator 202, a rotor 204, and a power source 206. In the embodiment of FIG. 2, while the stator 202 and the rotor 204 are disposed in a housing 208, and the power source 206 is disposed outside the housing 208. The rotor 204 may be disposed concentric with the stator 202 such that a center of the rotor 204 is aligned along the axial direction 20 of the electric machine 200. Moreover, in the embodiment of FIG. 2, the stator 202 is disposed such that the rotor 204 is surrounded by the stator 202. However, in alternative embodiments, the stator 202 and the rotor 204 may be designed and arranged such that the stator 202 is surrounded by the rotor 204.

The stator 202 may include a plurality of stator poles 218 and a stator winding 210. The stator winding 210 is disposed in slots between respective adjacent stator poles 218 and surrounds the respective stator poles 218. The stator winding 210 may be a multi-phase (e.g., three-phase) winding or a single-phase winding. The rotor 204 may include a rotor shaft 220, a rotor core 212, a plurality of permanent magnets 214, and one or more electrically conductive coils 216. In the electric machine 200 of FIG. 2, the permanent magnets 214 of an inverted V-shape are disposed within the rotor core 212. Although, the permanent magnets 214 are shown as having the inverted V-shape, the permanent magnets of different shapes including, but not limited to a V-shape, a rectangular shape, a trapezoid shape, or a square shape, may also be employed without limiting the scope of the present specification.

In some embodiments, the rotor core 212 may be mounted on the rotor shaft 220, while in some other embodiments, the rotor core 212 may be an integral part of the rotor shaft 220. Moreover, while in some embodiments, the rotor core 212 may be made of a solid block of material, in some other embodiments, the rotor core 212 may include a plurality of laminates (not shown in FIG. 2). The plurality of laminates may be stacked along the axial direction 20 of the electric machine 200 to form the rotor core 212.

In an embodiment when the rotor core 212 includes laminates, each of the laminates may be shaped such that when the laminates are stacked together, the laminates define one or more slots. These slots may be used to receive the permanent magnets 214. In one embodiment, each of the laminates may have one or more cut sections, where a part of the laminate is cut to form the cut sections based on a shape and number of permanent magnets that are to be used in the rotor 204. For example, in the embodiment of FIG. 4, each of the laminates may include four cut sections. The laminates having these cut sections are stacked such that corresponding cut sections of various laminates align with respect to one another to define a plurality of slots, where the slots are configured to receive respective permanent magnets. In the illustrated embodiment, the laminates may be stacked along the axial direction 20 of the electric machine 200 such that respective cut sections of each of the laminates are aligned to create four axial slots 222. It may be noted that the laminates with fewer or greater than four cut sections are also envisioned within the scope of the present application. In some embodiments, the cut sections of the laminates are shaped based on a shape of the permanent magnets. In a non-limiting example, when the permanent magnets 214 have the inverted V-shape as shown in FIG. 2, it is desirable that a shape of the cut sections is also an inverted V-shape. The laminates having the inverted V-shape may be stacked along the axial direction 20 to define the plurality of inverted V-shaped axial slots 222, as shown in FIG. 2. In another embodiment when the rotor core is a solid block of material, axial slots, for example, the inverted V-shaped axial slots 222 are defined in the solid block of material.

In certain embodiments, one permanent magnet 214 may be disposed in each axial slot 222 of the plurality of axial slots 222. More particularly, in the electric machine 200 of FIG. 2, the permanent magnets 214 are disposed within the rotor core 212 such that the permanent magnets 214 are shielded from exposure to the stator 202. In some embodiments, the permanent magnet 214 may be a single piece of magnetic material. In certain embodiments, the permanent magnet 214 may include a plurality of permanent magnet segments.

Additionally, the electric machine 200 also includes one or more electrically conductive coils 216 disposed at least partially within the rotor core 212. The electrically conductive coils 216 aid in modulating the torque exerted on the rotor 204. In the embodiment of FIG. 2, the electrically conductive coils 216 are disposed within the rotor core 212. As previously noted, the coils 216 are made using electrically conductive materials including, such as, but not limited to, copper, aluminum, silver, gold, or combinations thereof. In some embodiments, the electrically conductive coils 216 are disposed such that the electrically conductive coils 216 surrounding the respective permanent magnets 214 (for example, as illustrated in FIG. 3).

The power source 206 of the electric machine 200 is electrically coupled to the electrically conducive coils 216. In certain embodiments, the power source 206 may be electrically coupled between the electrically conducive coils 216 and the stator winding 210. The power source 206 of FIG. 2 is representative of one embodiment of the power source 106 and configured to provide electrical excitation (i.e., current) to the electrically conducive coils 216. More particularly, the power source 206 may be configured to provide DC current to the electrically conducive coils 216 during operation of the electric machine 200. Consequently, when the current is passed through the electrically conducive coils 216, the electrically conducive coils 216 act as electromagnets and cause an electromagnetic field in addition to the electromagnetic field caused by the stator 202 and the magnetic field caused by the permanent magnets 214. Such additional electromagnetic field further strengthens a flux density of the magnetic field caused by the permanent magnets 214 and results in an increase in an overall torque exerted on the rotor 204. In some embodiments, by controlling the current through the electrically conductive coils 216, an operating torque of the rotor 204 may be controlled.

Figure 3:
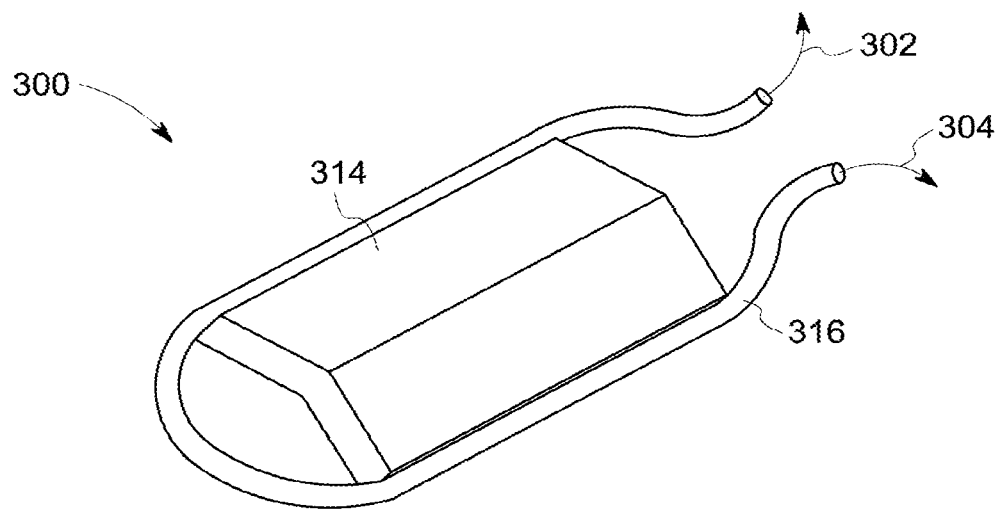
FIG. 3 is a diagrammatical representation of an arrangement of an electrically conductive coil disposed at least partially around a permanent magnet of a rotor core, in accordance with one or more embodiments of the present specification.

Referring now to a diagrammatical representation 300 of FIG. 3, a portion of the electric machine 200 of FIG. 2 having an arrangement of an electrically conductive coil 316 and a permanent magnet 314 is illustrated. For ease of illustration, other elements of the electric machine 200 of FIG. 2 are not shown. As illustrated in FIG. 3, in one embodiment, the electrically conductive coil 316 is disposed such that the permanent magnet 314 is at least partially surrounded by the electrically conductive coil 316. More particularly, in the illustrated embodiment of FIG. 3, the electrically conductive coil 316 is disposed such that the permanent magnet 314 is surrounded by the electrically conductive coil 316 in the axial direction 20 and the radial direction 22. For example, the electrically conductive coil 316 is disposed such that the permanent magnet 314 is surrounded by the electrically conductive coil 316 along a length and a width of the permanent magnet 314. Moreover, curved arrows 302 and 304 indicate progress of that electrically conductive coil 316 toward respective adjacent permanent magnets (not shown in FIG. 3). Like the permanent magnet 314 of FIG. 3, other permanent magnets 314 may also be at least partially surrounded by respective electrically conductive coils 316.

Figure 4:
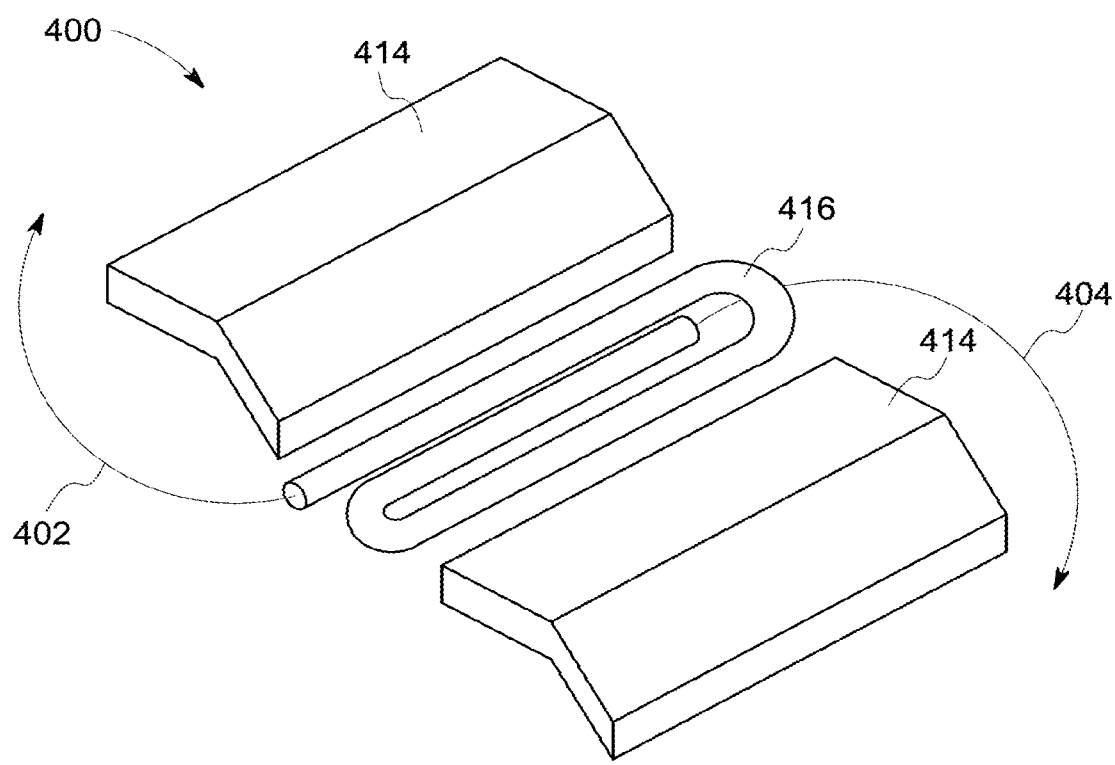
FIG. 4 is a diagrammatical representation of an alternative arrangement of an electrically conductive coil disposed between adjacent permanent magnets of a rotor core, in accordance with one or more embodiments of the present specification.

In certain embodiments, the electrically conductive coils, such as coils 216, are disposed between adjacent permanent magnets of the plurality of permanent magnets, such as permanent magnets 214. FIG. 4 is a diagrammatical representation 400 showing an alternative arrangement of FIG. 3. In the illustrated embodiment, an electrically conductive coil 416 is disposed between adjacent permanent magnets 414. More particularly, the electrically conductive coil 416 is disposed in the rotor core 412 (not shown in FIG. 4) between the adjacent permanent magnets 414. In the embodiment of FIG. 4, the electrically conductive coil 416 is disposed between adjacent permanent magnets 414 along the entire length of the permanent magnets 414. However, in certain embodiments, the electrically conductive coil 416 may be disposed between adjacent permanent magnets 414 along a portion of the length of the permanent magnets 414. Moreover, curved arrows 402 and 404 indicate progress of the electrically conductive coil 416 toward respective adjacent permanent magnet pair (not shown in FIG. 4). Like the arrangement illustrated in FIG. 4, the electrically conductive coils 416 may also be disposed between other adjacent permanent magnets 414.

In the embodiments of FIGS. 3 and 4, the electrically conductive coils 316 and 416 are shown as having a single turn winding of electrically conductive wire or medium. However, it is to be noted that the scope of the present specification is not limited with respect to number of windings or turns of the electrically conductive electrically conductive coils. In some embodiments, number of turns of the electrically conductive wires of the electrically conductive coils 316, 416 surrounding each permanent magnet 314 (in the embodiment of FIG. 3) or between the adjacent permanent magnets 414 (in the embodiment of FIG. 4) is the same.

Referring now to FIG. 5, a diagrammatical representation of a cross-sectional view of an alternative embodiment of an electric machine 500. The electric machine 500 of FIG. 5 may be representative of one embodiment of the electric machine 100 of FIG. 1. Reference numerals 50, 52, and 54 respectively represents an axial direction, a radial direction, and a tangential direction of the electric machine 500. The electric machine 500 is a radial field electric machine, such as an exterior permanent magnet (EPM) motor, also referred to as a surface permanent magnet (SPM) motor.

The electric machine 500 includes a stator 502 and a rotor 504 disposed in a housing 508. More particularly, the rotor 504 may be disposed concentric to the stator 502 such that a center of the rotor 504 is aligned along the axial direction 50 of the electric machine 500. Moreover, in the embodiment of FIG. 5, the stator 502 is disposed such that the rotor 504 is surrounded by the stator 502. However, in alternative embodiments, the stator 502 and the rotor 504 may be designed and arranged such that the stator 502 is surrounded by the rotor 504.

It may also be noted that the configuration of the stator 502 is substantially similar to the stator 202 of FIG. 2. The rotor 504 of FIG. 5 has a different configuration than the rotor 204 of FIG. 2. The rotor 504 includes a rotor shaft 520, a rotor core 512, and a plurality of permanent magnets 514, and one or more electrically conductive coils 516. The rotor core 512 includes a plurality of slots 513. The permanent magnets 514 are disposed in contact with the rotor core 512 such that at least one surface of each of the permanent magnets 514 is exposed to the stator 502. More particularly, respective permanent magnet 514 is disposed in each of the plurality of slots 513 of the rotor core 512 such that at least one surface of each of the permanent magnets 514 is exposed to the stator 502. The electrically conductive coils 516 are disposed at least partially in the rotor core 512. In some embodiment, remaining portion of the electrically conductive coils 516 is disposed outside the rotor core 512. In one embodiment, at least one electrically conductive coil 516 may be disposed surrounding one or more of the permanent magnets 514 in a similar fashion as shown in FIG. 3. In another embodiment, at least one electrically conductive coil 516 may be disposed between adjacent permanent magnets 514 in a similar fashion as shown in FIG. 4. In some embodiments, the electrically conductive coil 516 may be disposed surrounding one or more of the permanent magnets 514 and disposed between some adjacent permanent magnets 514.

Additionally, the electric machine 500 also includes a power source 506 that is electrically coupled to the electrically conducive coils 516. In certain embodiments, the power source 506 may be electrically coupled between the electrically conducive coils 516 and a stator winding 510. The power source 506 of FIG. 5 may be representative of one embodiment of the power source 106 of FIG. 1 and configured to provide electrical excitation (for example, current) to the electrically conducive coils 516. More particularly, the power source 506 may be configured to provide DC current to the electrically conducive coils 516 during operation of the electric machine 500. When the current is passed through the electrically conducive coils 516, the electrically conducive coils 516 act as electromagnets and cause an electromagnetic field in addition to the electromagnetic field caused by the stator 502 and the magnetic field caused by the permanent magnets 514. Such additional electromagnetic field further strengthens a flux density of the magnetic field caused by the permanent magnets 514 and results in an increase in an overall torque exerted on the rotor 504. In some embodiments, by controlling the current through the electrically conductive coils 516, an operating torque of the rotor 504 may be controlled.

FIG. 6 is a diagrammatical representation of an axial cross-sectional view of yet another embodiment of an electric machine 600. The electric machine 600 as presented in FIG. 6 is an axial field electric machine, such as a linear motor. In one embodiment, the electric machine 600 may include a stationary stator 602 and a rotor (or translator) 604 that is movable relative to the stationary stator 902. For example, the stator 602 and/or the rotor 604 may have rectangular shapes.

The stator 602 may include a stator core 613 and a plurality of stator poles 618 disposed axially on the stator core 613, as shown in FIG. 6. The stator 602 may also include stator windings 610 disposed such that the one or more stator windings 610 surround the stator poles 618. More particularly, the stator windings 610 may be disposed in respective slots present between each of the stator poles 618.

In the embodiment of FIG. 6, the rotor 604 includes a rotor shaft 620, a rotor core 612, and a plurality of permanent magnets 614, and one or more electrically conductive coils 616. The rotor core 612 includes a plurality of slots 615. The permanent magnets 614 are disposed in contact with the rotor core 612 such that at least one surface of each of the permanent magnets 614 is exposed to the stator 602. More particularly, respective permanent magnets 614 are disposed in each of the plurality of slots 615 of the rotor core 612 such that at least one surface of each of the permanent magnets 614 is exposed to the stator 602.

Moreover, the electrically conductive coils 616 are disposed at least partially in the rotor core 612. In one embodiment, at least one electrically conductive coil 616 may be disposed surrounding one or more of the permanent magnets 614 in a similar fashion as shown in FIG. 3. In another embodiment, at least one electrically conductive coil 616 may be disposed between adjacent permanent magnets 614 in a similar fashion as shown in FIG. 4.

Additionally, the electric machine 600 also includes a power source (not shown) similar to the power source 106 which is electrically coupled to the electrically conducive coils 616. In certain embodiments, the power source may be electrically coupled between the electrically conducive coils 616 and the stator winding 610. The power source is configured to provide electrical excitation (i.e., current) to the electrically conducive coils 616 to modulate an operating torque of the rotor 604.

In some embodiments, in the electric machines 100, 200, 500, and 600, the corresponding power sources 106, 206, 506 may be directly coupled to the respective electrically conductive coils 116, 216, 516, 616. With such a configuration, the electric machines 100, 200, 500, 600 may be operated with an enhanced torque depending on a magnitude and/or frequency of the current supplied to the respective electrically conductive coils 116, 216, 516, 616. In certain other embodiments, the electric machines 100, 200, 500, and 600 may additionally include a switch (not shown) disposed between the power sources 106, 206, 506 and respective electrically conductive coils 116, 216, 516, 616. In such a configuration, the switch may be selectively controlled to enable or disable supply of the current to the respective electrically conductive coils 116, 216, 516, 616. Advantageously, the electric machines 100, 200, 500, and 600 may be selectively operated with enhanced torque.

Figure 7:
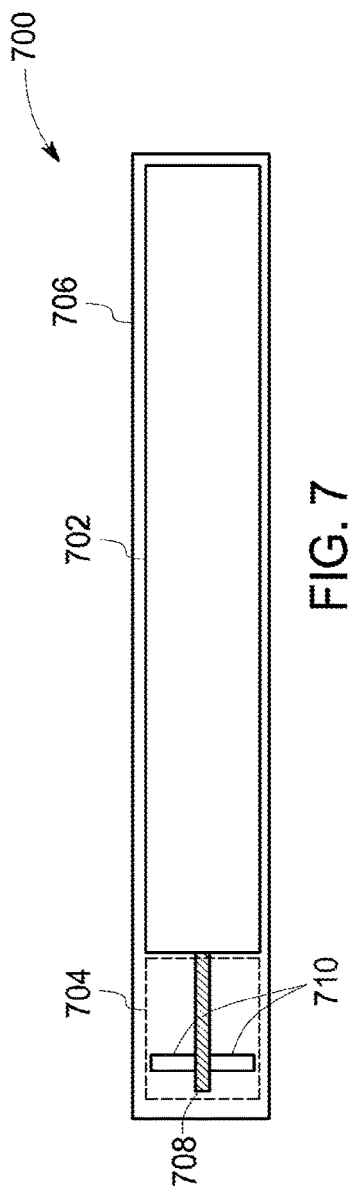
FIG. 7 is a diagrammatical block diagram of an electrical submersible pump (ESP), in accordance with one or more embodiments of the present specification.

FIG. 7 is a diagrammatical representation of an electric submersible pump (ESP) 700 that uses an electric machine 702 such as the electric machine 100, 200, 500, or 600, in accordance with aspects of the present specification. In certain embodiments, the ESP 700 includes the electric machine 702 and an impeller 704. The electric machine 702 and the impeller 704 may be disposed in a housing 706.

In some embodiments, the impeller 704 may include a shaft 708. The impeller 704 may further include a plurality of impeller blades 710 disposed on the shaft 708 to aid in accelerating flow of a fluid. By way of example, the plurality of impeller blades 710 is disposed circumferentially on the shaft 708. The electric machine 702 may be operatively coupled to the impeller 704 via the shaft 708.

The electric machine topologies described hereinabove provide electric machines with enhanced torque. In some embodiments, the enhanced topology of the rotor contributes to an improvement in the torque of the electric machine. More specifically, the rotor includes one or more electrically conductive coils that are electrically excited by a power source. The electrically conductive coils, when electrically excited, act as electromagnets and generate an electromagnetic field in addition to the magnetic field generated by the permanent magnets and the electromagnetic field generated by the stator. Such additional electromagnetic field increases a magnetic field flux density in the electric machine and facilitates application of additional torque on the rotor. In a non-limiting example, when such electric machine having improved torque is used in an ESP, results in an increase in the amount of fluid extracted by the ESP in a given time duration. Consequently, an overall cost of fluid extraction per unit measurement of the fluid may be lowered.

It will be appreciated that variants of the above disclosed and other features and functions, or alternatives thereof, may be combined to create many other different applications. Various unanticipated alternatives, modifications, variations, or improvements therein may be subsequently made by those skilled in the art and are also intended to be encompassed by the following representative embodiments.

The invention claimed is:

1. An electric machine, comprising:
   a stator;
   a rotor disposed adjacent to the stator and comprising:
      a rotor core;
      a plurality of permanent magnets disposed in contact with the rotor core; and
      one or more electrically conductive coils disposed at least partially within the rotor core, wherein the one or more electrically conductive coils are disposed surrounding and contacting at least one permanent magnet of the plurality of permanent magnets in an axial direction and a circumferential direction; and
   a power source electrically coupled to the one or more electrically conductive coils to supply electrical excitation to the one or more electrically conductive coils to modulate torque exerted on the rotor.

2. The electric machine of claim 1, wherein the rotor core comprises a plurality of slots on a surface of the rotor core, wherein the plurality of permanent magnets is disposed in the plurality of slots on a surface of the rotor core such that at least one surface of the each of the plurality of permanent magnets is exposed to the stator.

3. The electric machine of claim 1, wherein the rotor core comprises a plurality of slots within the rotor core, wherein the plurality of permanent magnets is disposed in the plurality of slots within the rotor core.

4. The electric machine of claim 1, wherein the one or more electrically conductive coils are disposed surrounding each permanent magnet of the plurality of permanent magnets along a length and a width of each of the plurality of permanent magnets.

5. The electric machine of claim 1, wherein the stator comprises:
   a stator core comprising a plurality of stator poles; and
   a stator winding disposed in slots between adjacent stator poles of the plurality of stator poles.

6. The electric machine of claim 5, wherein the power source comprises a power converter coupled between the stator winding and the one or more electrically conductive coils.

7. The electric machine of claim 6, wherein the power converter comprises an AC to direct current (DC) converter.

8. The electric machine of claim 6, wherein the power converter comprises at least one of a battery and a DC to DC converter.

9. The electric machine of claim 1, wherein the rotor is disposed within the stator.

10. The electric machine of claim 1, wherein the stator is disposed within the rotor.

11. The electric machine of claim 1, wherein the rotor core comprises a plurality of laminates.

12. An electric machine, comprising:
   a stator;
   a rotor disposed adjacent to the stator and comprising:
      a rotor core;
      a plurality of permanent magnets disposed in contact with the rotor core; and
      one or more electrically conductive coils disposed at least partially within the rotor core; and
   a power source electrically coupled to the one or more electrically conductive coils to supply electrical excitation to the one or more electrically conductive coils to modulate torque exerted on the rotor,
   wherein the one or more electrically conductive coils are disposed between adjacent permanent magnets of the plurality of permanent magnets,
   wherein the rotor core comprises a plurality of slots on a surface of the rotor core, wherein the plurality of permanent magnets is disposed in the plurality of slots on a surface of the rotor core such that at least one surface of the each of the plurality of permanent magnets is exposed to the stator,
   wherein the one or more electrically conductive coils are disposed surrounding and contacting respective permanent magnets of the plurality of permanent magnets in an axial direction and a circumferential direction.

13. An electric machine, comprising:
   a stator; and
   a rotor disposed adjacent to the stator and comprising:
      a rotor core;
      a plurality of permanent magnets disposed in contact with the rotor core; and
      one or more electrically conductive coils disposed at least partially within the rotor core to modulate torque exerted on the rotor, wherein the one or more electrically conductive coils are disposed surrounding and contacting at least one permanent magnet of the plurality of permanent magnets in an axial direction and a circumferential direction.

14. The electric machine of claim 13, wherein the one or more electrically conductive coils are disposed surrounding each of the plurality of permanent magnets along a length and a width of each of the plurality of magnets.

15. The electric machine of claim 13, further comprising a power source electrically coupled to the one or more electrically conductive coils to supply electrical excitation to the one or more electrically conductive coils to modulate torque exerted on the rotor.

16. The electric machine of claim 15, wherein the power source comprises an AC to direct current (DC) converter, a battery, a DC to DC converter, or combinations thereof.

17. An electric motor, comprising:
   a stator comprising a plurality of windings configured to be excited by an alternating current;
   a rotor disposed adjacent to the stator and comprising:
      a rotor core;
      a plurality of permanent magnets disposed in contact with the rotor core; and
      one or more electrically conductive coils disposed at partially within the rotor core, wherein the one or more electrically conductive coils are disposed surrounding and contacting at least one permanent magnet of the plurality of permanent magnets in an axial direction and a circumferential direction; and
   an alternating current (AC) to direct current (DC) converter electrically coupled between the one or more electrically conductive coils and the plurality of windings to generate a DC current from the AC current supplied to the plurality of windings and supply the DC current to the one or more electrically conductive coils to modulate torque exerted on the rotor.

18. The electric motor of claim 17, wherein the stator comprises a stator core comprising a plurality of stator poles, and wherein the plurality of windings is disposed in slots between adjacent stator poles of the plurality of stator poles.

19. The electric motor of claim 17, wherein the one or more electrically conductive coils are disposed between adjacent permanent magnets of the plurality of permanent magnets.

20. The electric motor of claim 17, wherein the one or more electrically conductive coils are disposed surrounding each of the respective permanent magnets of the plurality of permanent magnets along a length and width of each of the plurality of permanent magnets.

* * * * *

UNITED STATES PATENT AND TRADEMARK OFFICE
CERTIFICATE OF CORRECTION

PATENT NO. : 10,819,259 B2
APPLICATION NO. : 15/586336
DATED : October 27, 2020
INVENTOR(S) : Patel Bhageerath Reddy et al.

Page 1 of 1

It is certified that error appears in the above-identified patent and that said Letters Patent is hereby corrected as shown below:

In the Claims

In Claim 17, Column 12, Line 27, insert --least-- before "partially"

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*